(12) United States Patent
Karczewicz

(10) Patent No.: US 7,289,674 B2
(45) Date of Patent: Oct. 30, 2007

(54) SPATIAL PREDICTION BASED INTRA CODING

(75) Inventor: Marta Karczewicz, Irving, TX (US)

(73) Assignee: Nokia Corporation, Espoo (FI)

( * ) Notice: Subject to any disclaimer, the term of this patent is extended or adjusted under 35 U.S.C. 154(b) by 742 days.

(21) Appl. No.: 10/459,126

(22) Filed: Jun. 10, 2003

(65) Prior Publication Data

US 2004/0008771 A1    Jan. 15, 2004

Related U.S. Application Data

(60) Provisional application No. 60/395,178, filed on Jul. 9, 2002, provisional application No. 60/391,112, filed on Jun. 21, 2002, provisional application No. 60/388,061, filed on Jun. 11, 2002.

(51) Int. Cl.
*G06K 9/36*    (2006.01)
*G06K 9/46*    (2006.01)
(52) U.S. Cl. .................................................. 382/238
(58) Field of Classification Search ................ 382/232, 382/233, 238, 244, 245, 246; 375/240.03, 375/240.12, 240.15, 240.16, 240.24
See application file for complete search history.

(56) References Cited

U.S. PATENT DOCUMENTS

| 2001/0048719 | A1* | 12/2001 | Takeuchi et al. ....... 375/240.15 |
| 2004/0146109 | A1* | 7/2004 | Kondo et al. .......... 375/240.16 |
| 2006/0072662 | A1* | 4/2006 | Tourapis et al. ....... 375/240.12 |

FOREIGN PATENT DOCUMENTS

| WO | WO 01/54414 | 7/2001 |
| WO | WO 01/54416 | 7/2001 |

OTHER PUBLICATIONS

ITU-Telecommunications Standardization Sector, Video Coding Experts Group (VCEG); Greg Conklin; "New Intra Prediction Modes", Document VCEG-N54; pp. 1-10; Sep. 2001; Seattle, WA.
Joint Video Team (JVT) of ISO/IEC MPEG and ITU-T VCEG, JVT-DO15 draft 2; "Working Draft No. 2, Revision 4 (WD-2 rev 4)"; pp. 1-107; Apr. 2002.
Joint Video Team (JVT) of ISO/IEC MPEG and ITU-T VCEG, JVT-B118rd; "Editor's Proposed Modifications to Joint Committee Draft (CD) of Joint Video Specification (ITU-T Rec. H.264 | ISO/IEC 14496-10 AVC)"; pp. 1-134; Jun. 2002.

* cited by examiner

*Primary Examiner*—Amir Alavi

(57) ABSTRACT

A method and device for coding a digital image using intra-mode block prediction, wherein a list of prediction modes for each combination of prediction modes of the neighboring blocks is obtained. The modes assigned to each combination of prediction modes may be divided into two groups. The first group includes n (where n is smaller than the overall number of available modes) most probable prediction modes and the second group includes the remaining modes. The modes in the first group are ordered according to their probability. This order may be specified as a list of modes ordered from most probable to the least probable mode. The modes belonging to the second group may be ordered in some predetermined manner, which may be specified depending on the information already available to the decoder.

31 Claims, 6 Drawing Sheets

Q A B C D E F G H

I a b c d
J e f g h
K i j k l
L m n o p
M
N
O
P

SPATIAL PREDICTION BASED INTRA CODING

This application is a Continuation-In-Part and claims the benefit of a copending U.S. patent application Ser. No. 10/171,467, filed Jun. 12, 2002, assigned to the assignee of the instant application. This application is also based on and claims priority under 35 U.S.C. § 119(e) to U.S. provisional patent applications Ser. No. 60/388,061, filed Jun. 11, 2002, Ser. No. 60/391,112, filed Jun. 21, 2002, and Ser. No. 60/395,178, filed Jul. 9, 2002.

FIELD OF THE INVENTION

The present invention relates generally to image coding and, more particularly, to coding blocks of video frames.

BACKGROUND OF THE INVENTION

A digital image, such as a video image, a TV image, a still image or an image generated by a video recorder or a computer, consists of pixels arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed. In a typical video encoder, the frame of the original video sequence is partitioned into rectangular regions or blocks, which are encoded in Intra-mode (I-mode) or Inter-mode (P-mode). The blocks are coded independently using some kind of transform coding, such as DCT coding. However, pure block-based coding only reduces the inter-pixel correlation within a particular block, without considering the inter-block correlation of pixels, and it still produces high bit-rates for transmission. Current digital image coding standards also exploit certain methods that reduce the correlation of pixel values between blocks. to pixel B, etc. Similarly, if Mode 2 is selected, pixels a, b, c and d are predicted by setting them equal to pixel I, and pixels e, f, g and h are predicted by setting them equal to pixel J, etc. Thus, Mode 1 is a predictor in the vertical direction; and Mode 2 is a predictor in the horizontal direction. These modes are described in document VCEG-N54, published by ITU—Telecommunication Standardization Sector of Video Coding Expert Group (VCEG) in September 2001, and in document JVT-B118r2, published by the Joint Video Team of ISO/IEC MPEG and ITU-T VCEG in March, 2002.

Mode 0: DC Prediction

Generally all samples are predicted by (A+B+C+D+I+J+K+L+4)>>3. If four of the samples are outside the picture, the average of the remaining four is used for prediction. If all eight samples are outside the picture the prediction for all samples in the block is 128. A block may therefore always be predicted in this mode Mode 1: Vertical Prediction If A, B, C, D are inside the picture, then a, e. i, m are predicted by A, b, f, j, n are predicted by B, c, g. k, o are predicted by C, d, h. 1, p are predicted by D.

Mode 2: Horizontal Prediction

If E, F, G, H are inside the picture, then a, b, c, d are predicted by E, e, f, g, h are predicted by F, i, j, k, l are predicted by G, m, n, o, p are predicted by H.

Mode 3: Diagonal Down/Right Prediction

This mode is used only if all A, B, C, D, I, J, K, L, Q are inside the picture. This is a "diagonal" prediction.

In general, blocks encoded in P-mode are predicted from one of the previously coded and transmitted frames. The prediction information of a block is represented by a two-dimensional (2D) motion vector. For the blocks encoded in I-mode, the predicted block is formed using spatial prediction from already encoded neighboring blocks within the same frame. The prediction error, i.e., the difference between the block being encoded and the predicted block is represented as a set of weighted basis functions of some discrete transform. The transform is typically performed on an 8×8 or 4×4 block basis. The weights—transform coefficients—are subsequently quantized. Quantization introduces loss of information and, therefore, quantized coefficients have lower precision than the originals.

Quantized transform coefficients, together with motion vectors and some control information, form a complete coded sequence representation and are referred to as syntax elements. Prior to transmission from the encoder to the decoder, all syntax elements are entropy coded so as to further reduce the number of bits needed for their representation.

In the decoder, the block in the current frame is obtained by first constructing its prediction in the same manner as in the encoder and by adding to the prediction the compressed prediction error. The compressed prediction error is found by weighting the transform basis functions using the quantized coefficients. The difference between the reconstructed frame and the original frame is called reconstruction error.

The compression ratio, i.e., the ratio of the number of bits used to represent the original and compressed sequences, both in case of I- and P-blocks, is controlled by adjusting the value of the quantization parameter that is used to quantize transform coefficients. The compression ratio also depends on the employed method of entropy coding.

An example of spatial prediction used in a Working Draft Number 2 (WD2) of the JVT coder is described as follows. In order to perform the spatial prediction, the JVT coder offers 9 modes for prediction of 4×4 blocks, including DC prediction (Mode 0) and 8 directional modes, labeled 1 through 7, as shown in FIG. 1. The prediction process is illustrated in FIG. 2. As shown in FIG. 2, the pixels from a to p are to be encoded, and pixels A to Q from neighboring blocks that have already been encoded are used for prediction. If, for example, Mode 1 is selected, then pixels a, e, i and m are predicted by setting them equal to pixel A, and pixels b, f, j and n are predicted by setting them equal

| | |
|---|---|
| m is predicted by | (J + 2K + L + 2)>>2 |
| i, n are predicted by | (I + 2J + K + 2)>>2 |
| e, j, o are predicted by | (Q + 2I + J + 2)>>2 |
| a, f, k, p are predicted by | (A + 2Q + I + 2)>>2 |
| b, g, l are predicted by | (Q + 2A + B + 2)>>2 |
| c, h are predicted by | (A + 2B + C + 2)>>2 |
| d is predicted by | (B + 2C + D + 2)>>2 |

Mode 4: Diagonal Down/Left Prediction

This mode is used only if all A, B, C, D, I, J, K, L, Q are inside the picture. This is a "diagonal" prediction.

| | |
|---|---|
| a is predicted by | $(A + 2B + C + I + 2J + K + 4) >> 3$ |
| b, e are predicted by | $(B + 2C + D + J + 2K + L + 4) >> 3$ |
| c, f, i are predicted by | $(C + 2D + E + K + 2L + M + 4) >> 3$ |
| d, g, j, m are predicted by | $(D + 2E + F + L + 2M + N + 4) >> 3$ |
| h, k, n are predicted | $(E + 2F + G + M + 2N + O + 4) >> 3$ |
| l, o are predicted by | $(F + 2G + H + N + 2O + P + 4) >> 3$ |
| p is predicted by | $(G + H + O + P + 2) >> 3$ |

Mode 5: Vertical-Left Prediction

This mode is used only if all A, B, C, D, I, J, K, L, Q are inside the picture. This is a "diagonal" prediction.

| | |
|---|---|
| a, j are predicted by | $(Q + A + 1) >> 1$ |
| b, k are predicted by | $(A + B + 1) >> 1$ |
| c, l are predicted by | $(B + C + 1) >> 1$ |
| d is predicted by | $(C + D + 1) >> 1$ |
| e, n are predicted by | $(I + 2Q + A + 2) >> 2$ |
| f, o are predicted by | $(Q + 2A + B + 2) >> 2$ |
| g, p are predicted by | $(A + 2B + C + 2) >> 2$ |
| h is predicted by | $(B + 2C + D + 2) >> 2$ |
| i is predicted by | $(Q + 2I + J + 2) >> 2$ |
| m is predicted by | $(I + 2J + K + 2) >> 2$ |

Mode 6: Vertical-Right Prediction

This mode is used only if all A, B, C, D, I, J, K, L, Q are inside the picture. This is a "diagonal" prediction.

| | |
|---|---|
| a is predicted by | $(2A + 2B + J + 2K + L + 4) >> 3$ |
| b, i are predicted by | $(B + C + 1) >> 1$ |
| c, j are predicted by | $(C + D + 1) >> 1$ |
| d, k are predicted by | $(D + E + 1) >> 1$ |
| l is predicted by | $(E + F + 1) >> 1$ |
| e is predicted by | $(A + 2B + C + K + 2L + M + 4) >> 3$ |
| f, m are predicted by | $(B + 2C + D + 2) >> 2$ |
| g, n are predicted by | $(C + 2D + E + 2) >> 2$ |
| h, o are predicted by | $(D + 2E + F + 2) >> 2$ |
| p is predicted by | $(E + 2F + G + 2) >> 2$ |

Mode 7: Horizontal-Up Prediction

This mode is used only if all A, B, C, D, I, J, K, L, Q are inside the picture. This is a "diagonal" prediction.

| | |
|---|---|
| a is predicted by | $(B + 2C + D + 2I + 2J + 4) >> 3$ |
| b is predicted by | $(C + 2D + E + I + 2J + K + 4) >> 3$ |
| c, e are predicted by | $(D + 2E F + 2J + 2K + 4) >> 3$ |
| d, f are predicted by | $(E + 2F + G + J + 2K + L + 4) >> 3$ |
| g, i are predicted by | $(F + 2G + H + 2K + 2L + 4) >> 3$ |
| h, j are predicted by | $(G + 3H + K + 3L + 4) >> 3$ |
| l, n are predicted by | $(L + 2M + N + 2) >> 3$ |
| k, m are predicted by | $(G + H + L + M + 2) >> 2$ |
| o is predicted by | $(M + N + 1) >> 1$ |
| p is predicted by | $(M + 2N + O + 2) >> 2$ |

Mode 8: Horizontal-Down Prediction

This mode is used only if all A, B, C, D, I, J, K, L, Q are inside the picture. This is a "diagonal" prediction.

| | |
|---|---|
| a, g are predicted by | $(Q + I + 1) >> 1$ |
| b, h are predicted by | $(I + 2Q + A + 2) >> 2$ |
| c is predicted by | $(Q + 2A + B + 2) >> 2$ |
| d is predicted by | $(A + 2B + C + 2) >> 2$ |
| e, k are predicted by | $(I + J + 1) >> 1$ |
| f, l are predicted by | $(Q + 2I + J + 2) >> 2$ |
| i, o are predicted by | $(J + K + 1) >> 1$ |
| j, p are predicted by | $(I + 2J + K + 2) >> 2$ |
| m is predicted by | $(K + L 1) >> 1$ |
| n is predicted by | $(J + 2K + L + 2) >> 2$ |

Since each block must have a prediction mode assigned and transmitted to the decoder, this would require a considerable number of bits if coded directly. In order to reduce the amount of information to be transmitted, the correlation of the prediction modes of adjacent blocks can be used. For example, Vahteri et al. (WO 01/54416 A1, "A Method for Encoding Images and An Image Coder", hereafter referred to as Vahteri) discloses a block-based coding method wherein directionality information of the image within the blocks are used to classify a plurality of spatial prediction modes. The spatial prediction mode of a block is determined by the directionality information of at least one neighboring block.

In JVT coder, when the prediction modes of neighboring, already-coded blocks U and L are known, an ordering of the most probable prediction mode, the next most probable prediction mode, etc., for block C is given (FIG. 3). The ordering of modes is specified for each combination of prediction modes of U and L. This order can be specified as a list of prediction modes for block C ordered from the most to the least probable one. The ordered list used in the WD2 of the JVT coder, as disclosed in VCEG-N54, is given below:

TABLE 1

| | Prediction mode as a function of ordering signalled in the bitstream | | | | |
|---|---|---|---|---|---|
| L/U | outside | 0 | 1 | 2 | 3 |
| outside | | 0——— | 01——— | 10——— | |
| 0 | 02——— | | 125630487 | 021876543 | 021358647 |
| 1 | | 102654387 | 162530487 | 120657483 | 102536487 |
| 2 | 20——— | 280174365 | 217683504 | 287106435 | 281035764 |
| 3 | | 201385476 | 125368470 | 208137546 | 325814670 |
| 4 | | 201467835 | 162045873 | 204178635 | 420615837 |
| 5 | | 015263847 | 152638407 | 201584673 | 531286407 |

TABLE 1-continued

Prediction mode as a function of ordering signalled in the bitstream

| | | | | | |
|---|---|---|---|---|---|
| 6 | —— | 016247583 | 160245738 | 206147853 | 160245837 |
| 7 | —— | 270148635 | 217608543 | 278105463 | 270154863 |
| 8 | —— | 280173456 | 127834560 | 287104365 | 283510764 |

| L/U | 4 | 5 | 6 | 7 | 8 |
|---|---|---|---|---|---|
| outside | | | | | |
| 0 | 206147583 | 512368047 | 162054378 | 204761853 | 208134657 |
| 1 | 162045378 | 156320487 | 165423078 | 612047583 | 120685734 |
| 2 | 287640153 | 215368740 | 216748530 | 278016435 | 287103654 |
| 3 | 421068357 | 531268470 | 216584307 | 240831765 | 832510476 |
| 4 | 426015783 | 162458037 | 641205783 | 427061853 | 204851763 |
| 5 | 125063478 | 513620847 | 165230487 | 210856743 | 210853647 |
| 6 | 640127538 | 165204378 | 614027538 | 264170583 | 216084573 |
| 7 | 274601853 | 271650834 | 274615083 | 274086153 | 278406153 |
| 8 | 287461350 | 251368407 | 216847350 | 287410365 | 283074165 |

Here, an example of the prediction modes for the block C, as specified in the WD2 of the JVT coder, is given when the prediction mode for both U and L is 2. The string (2, 8, 7, 1, 0, 6, 4, 3, 5) indicates that mode 2 is also the most probable mode for block C. Mode 8 is the next most probable mode, etc. To the decoder the information will be transmitted indicating that the nth most probable mode will be used for block C. The ordering of the modes for block C can also be specified by listing the rank for each mode: the higher the rank, the less probable the prediction method. For the above example, the rank list would be (5, 4, 1, 8, 7, 9, 6, 3, 2). When the modes (0, 1, 2, 3, 4, 5, 6, 7, 8) are related to the rank list (5, 4, 1, 8, 7, 9, 6, 3, 2), we can tell that Mode 0 has a rank 5, Mode 1 has a rank 4, etc.

For more efficient coding, information on intra prediction of two 4×4 blocks can be coded in one codeword.

The above-mentioned method has one major drawback—the memory required to keep ordering of prediction modes for block C given prediction modes of blocks U and L is demanding. In WD2 of the JVT coder, because 9 modes are used for prediction, there are 9×9 possible combinations of modes for blocks U and L. For each combination, an ordering of 9 possible modes has to be specified. That means that 9×9×9 bytes (here it is assumed that one number requires one byte) are needed to specify the ordering of prediction modes. In addition, more memory may be required to specify the special cases—for example, if one or both blocks U and L are not available.

Thus, it is advantageous and desirable to provide a method and device for coding a digital image wherein the memory requirements are reduced while the loss in coding efficiency is minimal.

SUMMARY OF THE INVENTION

A method and device for coding a digital image using intra-mode block prediction is provided. A list of prediction modes for each combination of prediction modes of the neighboring blocks is obtained. The modes assigned to each combination of prediction modes may be divided into two groups. The first group includes m (where m is smaller than the overall number n of available modes) most probable prediction modes and the second group includes the remaining modes. The modes in the first group are ordered according to their probability. This order may be specified as a list of modes ordered from most probable to the least probable mode. The modes belonging to the second group may be ordered in some predetermined manner, which may be specified depending on the information already available to the decoder. Information is sent to the decoder regarding whether the mode selected for a given block belongs to the first group or to the second group. If it belongs to the first group, the information is transmitted indicating that ith most probable mode shall be used for a block C given the combination of modes for blocks U and L. If the mode belongs to the second group, the information is transmitted indicating that jth mode of this group should be used.

The present invention will become apparent upon reading the description taken in conjunction with FIGS. 4*a* to 8.

BEST MODE FOR CARRYING OUT THE INVENTION

Figure 3:
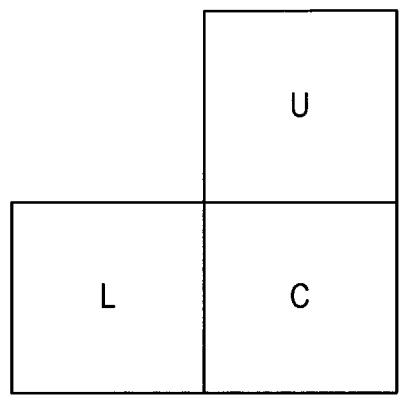
FIG. 3 is a schematic representation illustrating two neighboring blocks being used for the prediction of a current block.
Figure 4:
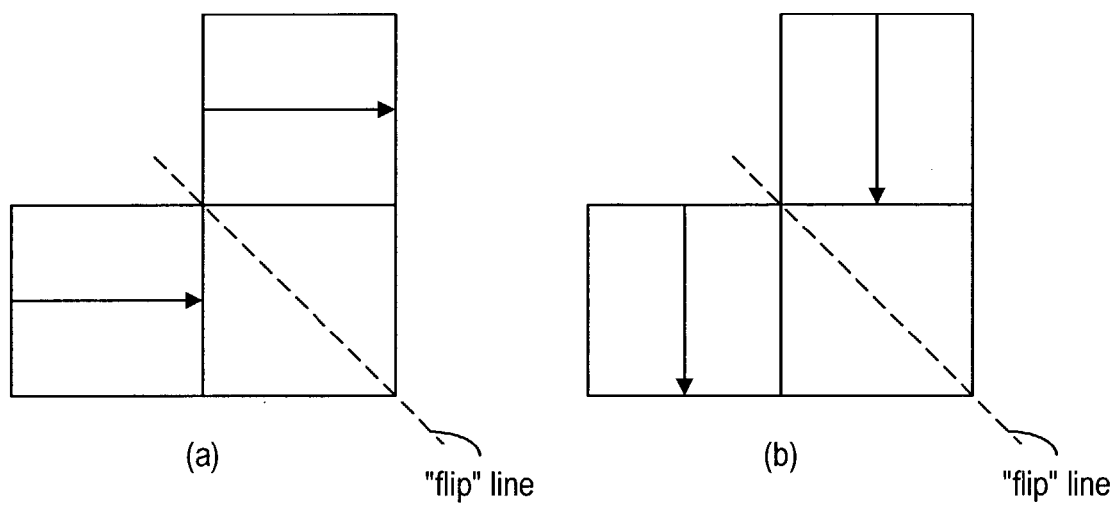
FIG. 4*a* is a schematic representation illustrating the spatial prediction mode of two neighboring blocks used for the prediction of a current block.
FIG. 4*b* is a schematic representation illustrating the spatial prediction mode of two neighboring blocks having a mirrored relationship with those of FIG. 4*a*.
Figure 5:
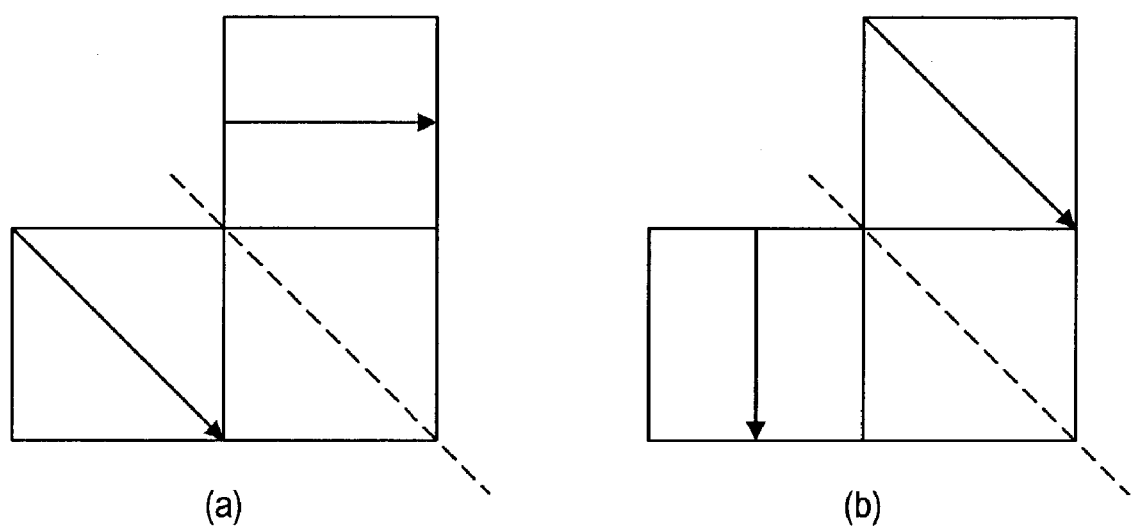
FIG. 5*a* is a schematic representation illustrating another spatial prediction mode pair.
FIG. 5*b* is a schematic representation illustrating the mirrored mode pair.

An embodiment of the present invention utilizes the property that it is possible to obtain an ordered list of prediction modes for one combination of prediction modes of neighboring blocks as a function of prediction modes for another combination. For illustration purposes, prediction modes of two neighboring blocks U and L, as shown in FIG. 3, are used to infer the prediction of the current block C. It is noted that a combination of prediction modes in FIG. 4a can be obtained by flipping diagonally the prediction modes, as shown in FIG. 4b. Accordingly, the nth most probable prediction mode for block C, when the combination of modes in FIG. 4a is used, should be the same as the "flipped diagonally", nth-most-probable prediction mode for the combination of modes in FIG. 4b. Thus, if the neighboring blocks U and L have the modes "vertical" and "vertical", the prediction mode of the current block C is most probably "vertical" (FIG. 4b). Consequently, when these blocks are "flipped" or mirrored against the diagonal ("down/right"), we know that from "horizontal" and "horizontal" we should get "horizontal" for the current block (FIG. 4a). Similarly, if the neighboring blocks U and L are of Modes 2 and 3, as shown in FIG. 5a, then the flipped blocks U and L will be of Modes 3 and 1, as shown in FIG. 5b.

Figures 1, 2:
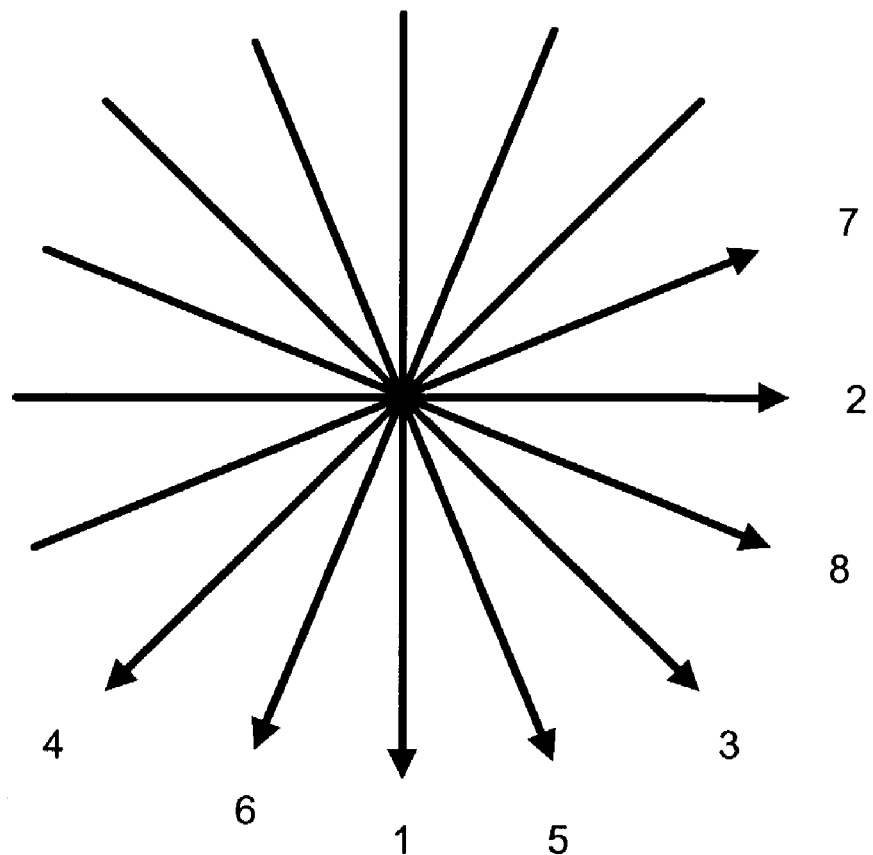
FIG. 1 is a schematic representation illustrating 8 directional modes that are used as spatial prediction modes.
FIG. 2 is a schematic representation illustrating the pixels that are used for the prediction of a current 4×4 block of pixels.

To further illustrate this example, let us define the function f which maps the prediction direction i into j, j=f(i) as follows. Each prediction mode i is assigned a prediction mode j obtained by mirroring it about the diagonal line going from upper left corner of the block to lower right corner of the block. For the prediction modes in FIG. 1, the resulting assignment is summarized in Table II.

TABLE II

| i | j |
|---|---|
| 0 | 0 |
| 1 | 2 |
| 2 | 1 |
| 3 | 3 |
| 4 | 4 |
| 5 | 8 |
| 6 | 7 |
| 7 | 6 |
| 8 | 5 |

When the function is defined as above, the ordered list of prediction modes for the combination of modes (k,l) can be determined based on the ordered list for combination (i,j) such that i=f(l) and j=f (k), i.e., if the prediction mode p is the nth most probable mode for the combination (i,j), the nth mode for the combination (k,l) is equal to f(p). As an example let us consider the combination of modes (1,1) to which the ordered list of modes for block C is assigned: (1, 6, 2, 5, 3, 0, 4, 8, 7). It should be possible to obtain the ordered list of the prediction modes for combination (2,2) from this ordered list by mapping using the function f: (2, 7, 1, 8, 3, 0, 4, 6, 5). Similarly, the ordered list of the prediction modes for combination (2,3) is (2, 0, 8, 1, 3, 7, 5, 4, 6) and the ordered list of modes f(2,3)=(3,1) is f(2, 0, 8, 1, 3, 7, 5, 4, 6)=(1, 0, 5, 2, 3, 6, 8, 4, 7). It should be noted that the ordered list of prediction modes for (k,l) can be substantially symmetrical to that for (i,j). Thus, the mapping function f can be described as a mirroring function.

The primary objective of the present invention is to reduce the size of the table specifying prediction mode as a function of prediction modes of already coded, neighboring blocks (e.g., TABLE I). This table is obtained during the training process. To find the ordered list of prediction modes for combination of modes (i,j) for some large number of blocks C for which neighboring blocks have this combination, the number each prediction mode is chosen according to a given selection criterion (e.g., the smallest prediction error) is counted. This number determines the rank of prediction mode in the list of prediction modes assigned to combination (i,j), more frequently the mode is chosen, higher the rank it has in the list of prediction modes.

When, during the training process the described mapping of the prediction modes is used, the resulting table specifying prediction modes will be smaller. If the ordered list for combination (k,l) can be obtained from ordered list for combination (i,j) only the ordered list for combination (i,j) has to be stored. During the training, the mapping can be introduced as follows. The frequency of occurrence of each prediction mode for the combinations (k,l) and (i,j) such that i=f(l) and j=f(k) is counted jointly, i.e., if prediction mode p was chosen for combination (k,l) it is also counted that prediction mode f(p) was chosen for combination (i,j). As well when prediction mode s was chosen for combination (i,j) it is counted that prediction mode f(s) was chosen for combination (k,l).

The reduced prediction table, according to the present invention, is shown in TABLE III.

TABLE III

Reduced Prediction Table

| L/U | outside | 0 | 1 | 2 | 3 |
|---|---|---|---|---|---|
| outside |  | 0—— | 01—— | 10—— |  |
| 0 | 02—— | 024167835 | 150642387 | 027486135 | 013245867 |
| 1 |  |  | 150643278 | 021468735 | 105436287 |
| 2 | 20—— |  | 124086573 |  | 283407156 |
| 3 |  |  |  |  | 385240167 |
| 4 |  |  |  |  |  |
| 5 |  |  |  |  |  |
| 6 |  |  |  |  |  |
| 7 |  |  |  |  |  |
| 8 |  |  |  |  |  |

| L/U | 4 | 5 | 6 | 7 | 8 |
|---|---|---|---|---|---|
| outside |  |  |  |  |  |
| 0 | 012465738 | 150346287 | 160452387 | 024716835 | 028413765 |
| 1 | 104562378 | 156403287 | 165403278 | 014652738 | 014256837 |
| 2 | 240781635 | 214835076 | 241086735 | 207483165 | 280473156 |
| 3 | 413205876 | 531480267 | 146530287 | 247308516 | 832045176 |

TABLE III-continued

| | | Reduced Prediction Table | | | |
|---|---|---|---|---|---|
| 4 | 420671835 | 145602387 | 461027538 | 407261835 | 248073165 |
| 5 | | 513406287 | 165402387 | 240158376 | 082354167 |
| 6 | | 614503287 | 614057328 | 042617385 | 024681357 |
| 7 | | 427016385 | 426701835 | | 284703615 |
| 8 | | 328514067 | 248361075 | 248703651 | |

In TABLE III for some combinations (U, L), the ordered list of prediction modes is not given. The ordered lists for those combinations can be "restored" by mapping the corresponding elements that are retained in the prediction table when those "restored" elements are needed for the prediction of a current block. Thus, in general, as long as an element in the prediction table can be obtained or restored from another element in the prediction table by way of mapping, the former can be eliminated. In other words, in a prediction table comprising a first group of elements and a second group of elements, wherein each of the second group of elements can be restored from a corresponding element in the first group by a mapping function, the second group of elements can be eliminated.

Figure 6:
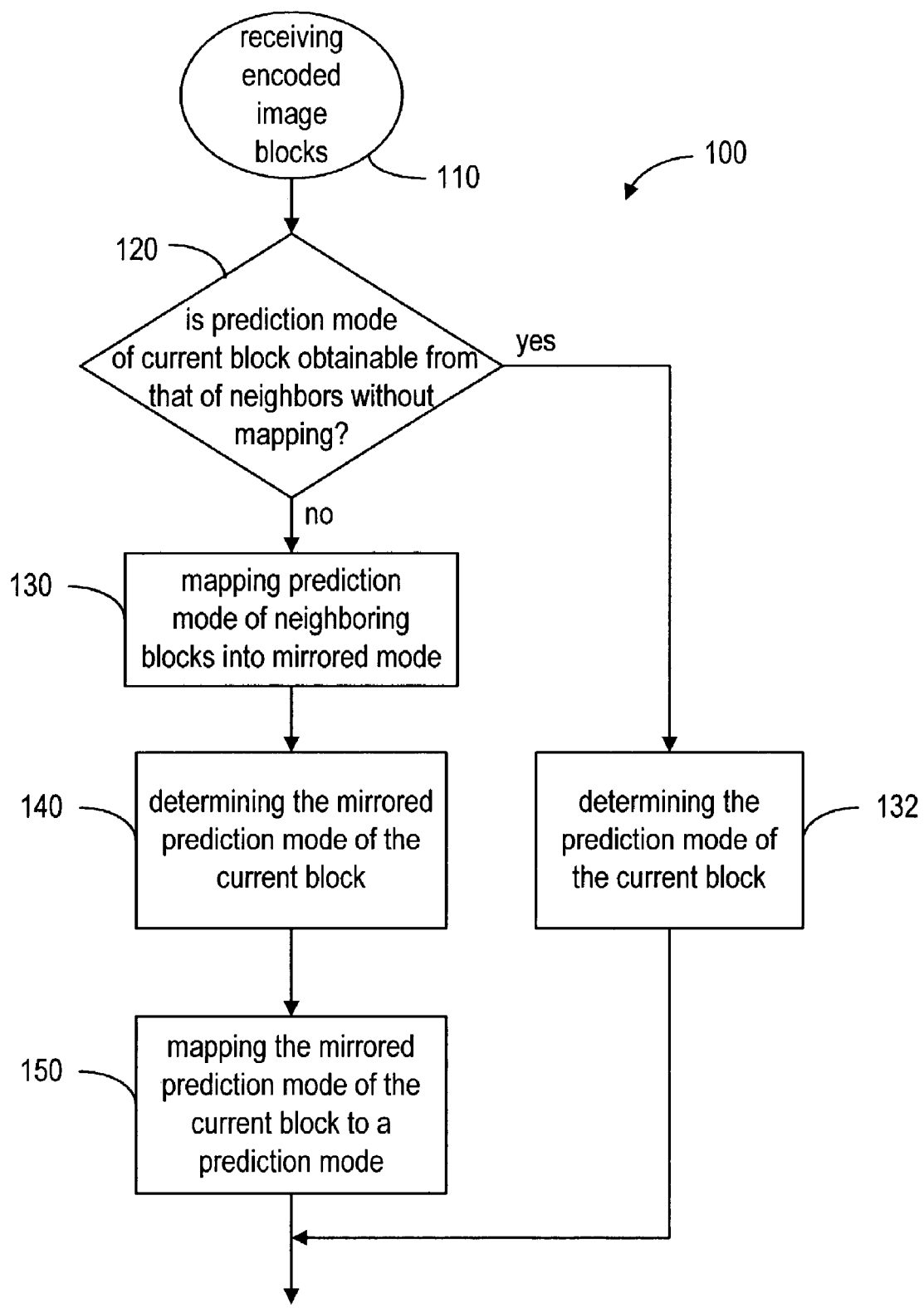
FIG. 6 is a flow-charting illustrating the method of spatial prediction.

FIG. 6 is a flowchart illustrating the decoding stage when the symmetry in the prediction table is utilized. As shown, the method 100 comprises receiving a plurality of image blocks at step 110. When a current block is processed, it is determined at step 120 whether the prediction mode for the current block can be obtained from the prediction mode for the neighboring blocks without mapping. If so, then the spatial prediction mode of the current block is determined based on the prediction mode of the neighboring blocks at step 132. Otherwise, a complementary prediction mode of the neighboring blocks is provided at step 130, and a complementary prediction mode of the current block is determined based on the complementary prediction mode of the neighboring blocks at step 140. At step 150, the complementary prediction mode of the current block is mapped into the prediction mode of the current block.

Alternatively, it is possible to assign the same label to different prediction modes (grouping them together) of blocks U and L before using them to specify the prediction mode for block C. For example, in the case of the JVT coder, modes 1, 5 and 6 can be grouped together and labeled as 1, and modes 2, 7 and 8 can be grouped together and labeled as 2. As can be seen from FIG. 1, the directions of modes 7 and 8 are close to the direction of mode 2, and the directions of modes 5 and 6 are close to the direction of mode 1. After this grouping, each of blocks U and L can have one of the 5 modes labeled as 0, 1, 2, 3 and 4. Therefore, instead of 9×9 possible combinations of prediction modes of U and L, there are only 5×5 such combinations. Accordingly, the memory required to specify ordering of prediction modes for block C, given prediction modes of blocks U and L, will be 5×5×9 bytes, instead of 9×9×9 bytes (assuming that 1 byte of memory is required to hold 1 number). Furthermore, if the mapping function $f$ is used for "flipping" the ordered lists, the prediction table can be further simplified.

An example of the table specifying prediction mode as a function of ordering signaled in the bitstream when both of these methods are used in conjunction is given in TABLE IV.

TABLE IV

| L/U | outside | 0 | 1 | 2 | 3 | 4 |
|---|---|---|---|---|---|---|
| Outside | | 0— | 01— | 10— | | |
| 0 | 02— | 024167835 | 150642387 | 024781635 | 013245867 | 012465738 |
| 1 | | | 156043278 | 021468375 | 153046827 | 140652378 |
| 2 | 20— | | 214806357 | | 283407156 | 247081635 |
| 3 | | | | | 385240167 | 413205876 |
| 4 | | | | | | 420671835 |

Moreover, it is also possible to limit the number of prediction modes for block C given prediction modes of blocks U and L. In the case of the JVT coder, there would still be 9×9 possible combination of prediction modes of U and L. But to each of these combinations only m modes would be assigned, where m is smaller than 9. Accordingly, the number of the probable prediction modes is reduced to (9×9×m)<(9×9×9). Similarly, if the mapping function $f$ is used for "flipping" the ordered lists, the prediction table can be further simplified.

These methods can be used jointly or separately.

Figure 7:
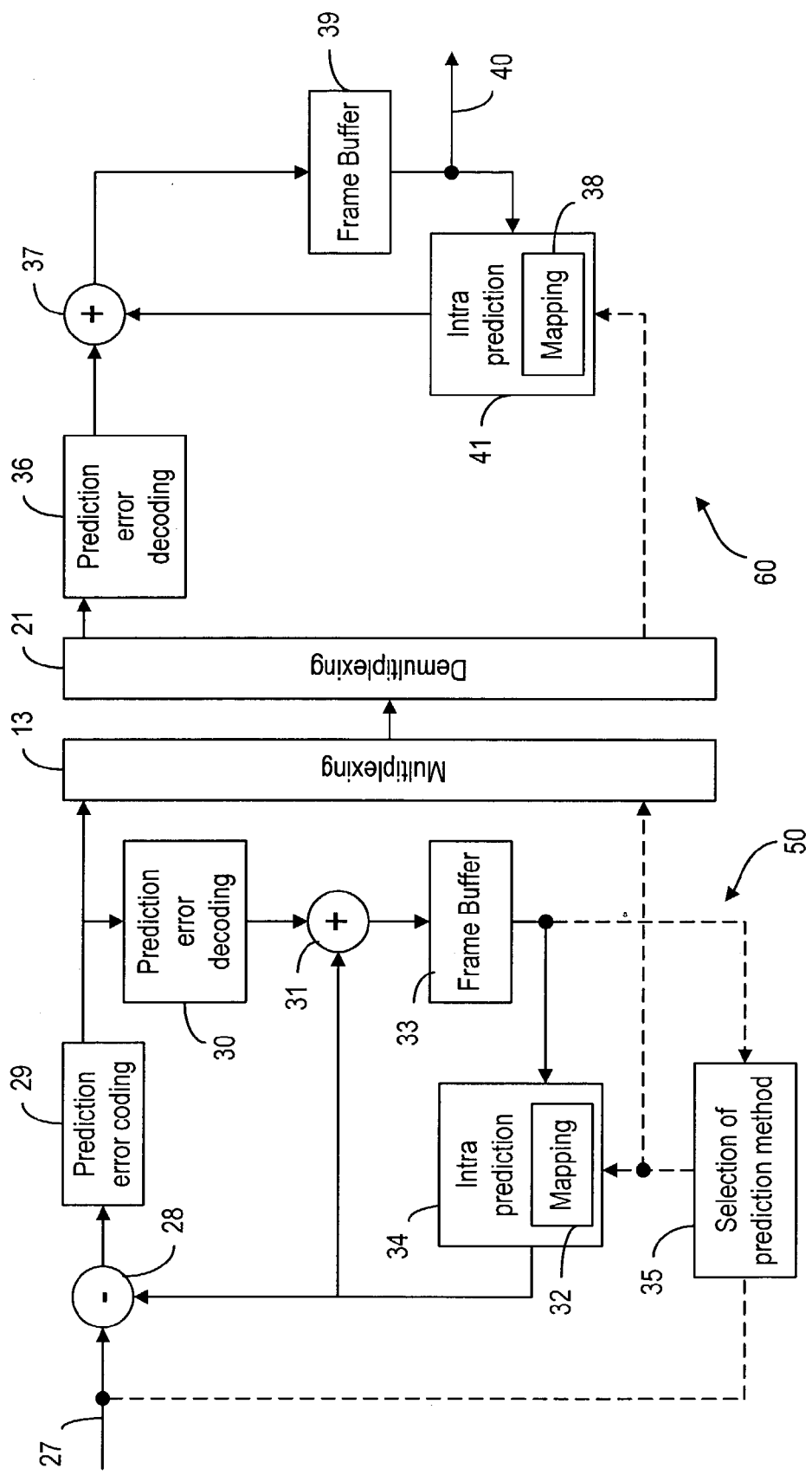
FIG. 7 is a block diagram illustrating a digital image block transfer system for implementing the method according to an embodiment of the present invention.

The spatial, prediction-based intra-coding, according to present invention, can be readily incorporated into a digital, image-block transfer system, as shown in FIG. 7. Assuming that a frame is to be encoded in intra format using some form of intra prediction, encoding of the frame proceeds as follows. The blocks of the frame to be coded are directed one by one to the encoder 50 of the video transfer system presented in FIG. 7. The blocks of the frame are received from a digital image source, e.g. a camera or a video recorder (not shown) at an input 27 of the image transfer system. In a manner known as such, the blocks received from the digital image source comprise image pixel values. The frame can be stored temporarily in a frame memory (not shown), or alternatively, the encoder receives the input data directly block by block.

The blocks are directed one by one to a prediction method selection block 35 that determines whether the pixel values of the current block to be encoded can be predicted on the basis of previously intra-coded blocks within the same frame or segment. In order to do this, the prediction method selection block 35 receives input from a frame buffer of the encoder 33, which contains a record of previously encoded and subsequently decoded and reconstructed intra blocks. In this way, the prediction method selection block can determine whether prediction of the current block can be performed on the basis of previously decoded and reconstructed blocks. Furthermore, if appropriate decoded blocks are available, the prediction method selection block 35 can select the most appropriate method for predicting the pixel values of the current block, if more than one such method may be chosen. It should be appreciated that in certain cases, prediction of the current block is not possible because appropriate blocks for use in prediction are not available in the frame buffer 33. In the situation where more than one prediction method is available, information about the chosen prediction method is supplied to multiplexer 13 for further transmission to the decoder. It should also be noted that in some prediction methods, certain parameters necessary to perform the prediction are transmitted to the decoder. This is, of course, dependent on the exact implementation adopted and in no way limits the application of the prediction-based intra coding according to the present invention.

Pixel values of the current block are predicted in the intra prediction block 34. The intra prediction block 34 receives input concerning the chosen prediction method from the prediction method selection block 35 and information concerning the blocks available for use in prediction from frame buffer 33. On the basis of this information, the intra prediction block 34 constructs a prediction for the current block. The predicted pixel values for the current block are sent to a differential summer 28 which produces a prediction error block by taking the difference between the pixel values of the predicted current block and the actual pixel values of the current block received from input 27. Next, the error information for the predicted block is encoded in the prediction error coding block in an efficient form for transmission, for example using a discrete cosine transform (DCT). The encoded prediction error block is sent to multiplexer 13 for further transmission to the decoder. The encoder of the digital image transmission system also includes decoding functionality. The encoded prediction error of the current block is decoded in prediction error decoding block 30 and is subsequently summed in summer 31 with the predicted pixel values for the current block. In this way, a decoded version of the current block is obtained. The decoded current block is then directed to the frame buffer 33.

Here, it is also assumed that the receiver receives the blocks that form a digital image frame one by one from a transmission channel.

In the receiver, 60, a demultiplexer receives the demultiplexed coded prediction error blocks and prediction information transmitted from the encoder 50. Depending on the prediction method in question, the prediction information may include parameters used in the prediction process. It should be appreciated that in the case that only one intra prediction method is used, information concerning the prediction method used to code the blocks is unnecessary, although it may still be necessary to transmit parameters used in the prediction process. In FIG. 7, dotted lines are used to represent the optional transmission and reception of prediction method information and/or prediction parameters. Assuming more than one intra prediction method may be used, information concerning the choice of prediction method for the current block being decoded is provided to intra prediction block 41. Intra prediction block 41 examines the contents of frame buffer 39 to determine if there exist previously decoded blocks to be used in the prediction of the pixel values of the current block. If such image blocks exist, intra prediction block 41 predicts the contents of the current block using the prediction method indicated by the received prediction method information and possible prediction-related parameters received from the encoder. Prediction error information associated with the current block is received by prediction error decoding block 36, which decodes the prediction error block using an appropriate method. For example, if the prediction error information was encoded using a discrete cosine transform, the prediction error decoding block performs an inverse DCT to retrieve the error information. The prediction error information is then summed with the prediction for the current image block in summer 37 and the output of the summer is applied to the frame buffer 39. Furthermore, as each block is decoded, it is directed to the output of the decoder 40, for example, to be displayed on some form of display means. Alternatively, the image frame may be displayed only after the whole frame has been decoded and accumulated in the frame buffer 39.

It should be noted that the intra-prediction block 34 constructs a prediction of the current block based on the previously encoded and subsequently decoded and reconstructed intra blocks as provided by the frame buffer 33. In particular, the prediction of the current block is determined from the spatial prediction modes of the previously reconstructed intra blocks using a prediction table, as shown in TABLE III or TABLE IV (not shown in FIG. 7). However, when the ordered list for the prediction modes (i,j) of the previously reconstructed intra blocks are missing from the prediction table, a mapping block 32 can be used to map the spatial prediction modes of the previously reconstructed blocks into complementary or mirrored spatial prediction modes (k,l). At this point, the intra prediction block 34 can determine the complementary or mirrored prediction mode f(p) for the current block. Again the mapping block 32 is used to obtained the prediction mode p of the current block by mapping the complementary prediction mode f(p). Likewise, a mapping block 38 is used for mapping when needed.

Figure 8:
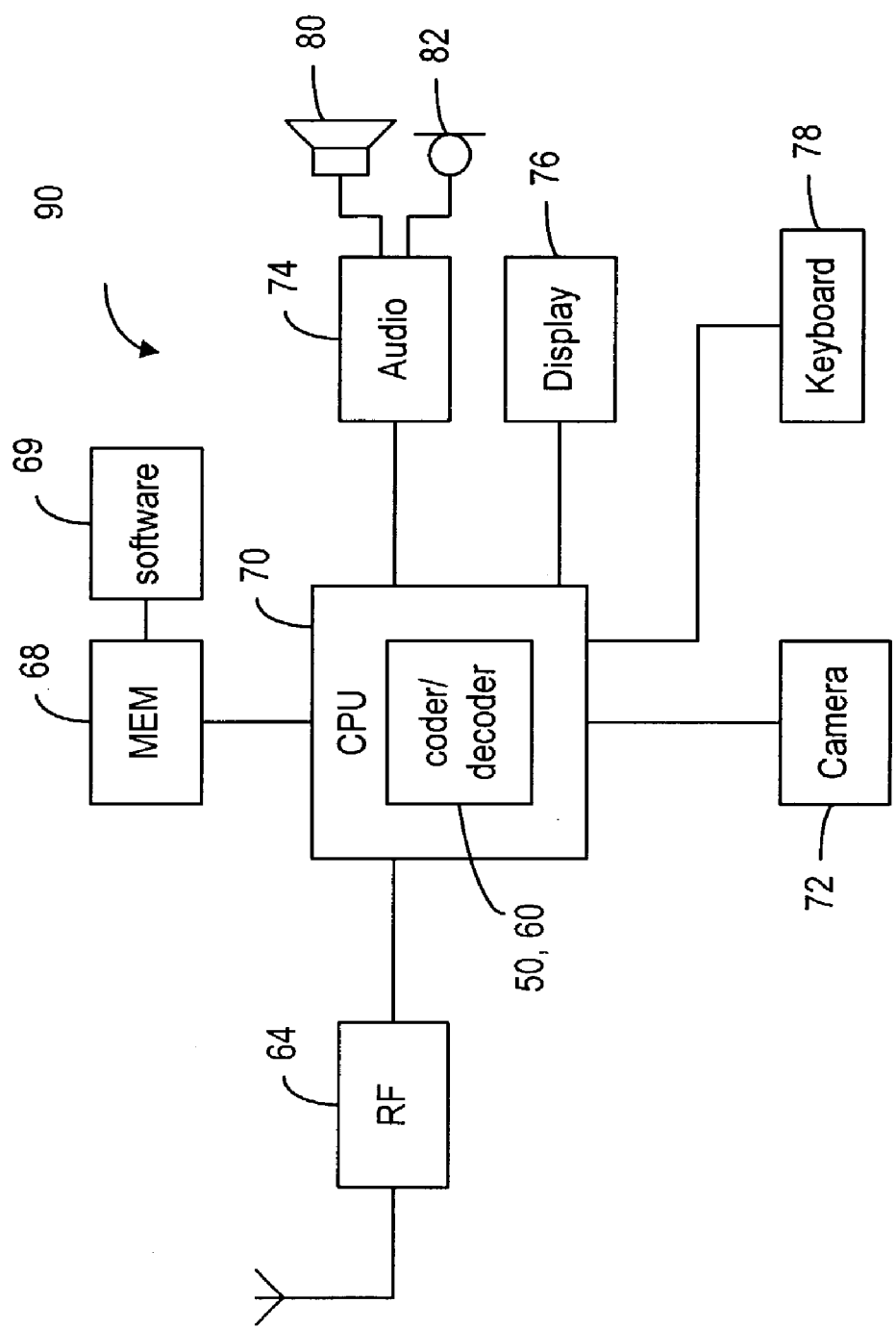
FIG. 8 is a block diagram illustrating a portable video telecommunications device implementing the method according to an embodiment of the present invention.

The mapping algorithm, which is used to perform the mapping of (i,j) to (k,l) and the mapping of f(p) top, can be coded in a software program 69, which comprises machine executable steps or pseudo codes for performing the method according to the present invention. Advantageously, the software program is stored in a storage medium. For example, the software program is stored in a memory unit resident in a CPU 70, or in a separate memory unit 68, as shown in FIG. 8. FIG. 8 presents a simplified schematic diagram of a mobile terminal 90 intended for use as a portable video telecommunications device, incorporating the prediction mode mapping method of the present invention. The mobile terminal 90 comprises at least a display module 76 for displaying images, an image capturing device 72, and an audio module 74 for capturing audio information from an audio input device 82 and reproducing audio information on an audio producing device 80. Advantageously, the mobile terminal 90 further comprises a keyboard 78 for inputting data and commands, a radio frequency component 64 for communicating with a mobile telecommunications network and a signal/data processing unit 70 for controlling the operation of the telecommunications device. Preferably, the digital image block transfer system (50, 60) is implemented within in the processor 70.

In accordance with a further embodiment of the present invention, memory requirements could be limited while achieving coding efficiency.

It has been observed that for each combination of modes for blocks U and L there are just a few modes for block C that have a high probability of occurrence. The probability of the remaining modes is much smaller. Moreover, probabilities of occurrence of these remaining modes are similar, and therefore, their order in the ordered set of modes does not have strong influence on the coding efficiency.

The modes assigned to each combination of prediction modes of U and L may be divided into two groups. The first group includes m (where m is smaller than the overall number n of available modes) most probable prediction modes and the second group includes the remaining modes. The modes in the first group are ordered according to their probability. As described above, this order may be specified as a list of modes ordered from most probable to the least probable mode. The modes belonging to the second group may be ordered in some predetermined manner, which may be specified depending on the information already available to the decoder. For example, prediction mode that is labeled using smaller number may precede prediction mode that is labeled using larger number.

In other words the prediction modes are arranged into an ordered set S. The ordered set of modes R assigned to combination of prediction modes for U and L is created by combining two ordered sets of modes $T=\{t_1, t_2, \ldots, t_k\}$ and $V=\{v_1, v_2, \ldots, v_l\}$:

$$R=\{t_1, t_2, \ldots, t_k, v_1, v_2, \ldots, v_l\}.$$

The modes in the first ordered set T are ordered according to their expected probability of occurrence for combination of modes for neighboring blocks U and L. The more frequently the mode is expected to occur, the fewer bits should be used to signal it. The second ordered set of modes V is created by removing elements of the first set T from the set S and preserving the order of the remaining elements. For example, if prediction i preceded prediction mode j in the ordered set S, prediction i should precede prediction mode j in the set V.

As an exemplar, let us consider modes available in the JVT coder and assume that for each combination of modes for blocks U and L only the most probable mode is assigned to the first group. The remaining 8 modes are listed in the ascending order of their number. To further illustrate this exemplar, let us consider the combination of modes (1,1) to which mode 1 is assigned as the most probable mode. Mode 1 constitutes the first ordered set T. The second ordered set V is created by removing mode 1 from the ordered set S, i.e., V={0, 2, 3, 4, 5, 6, 7, 8}. Here the ordered set S is created by listing the nine prediction modes in ascending order of the numbers, i.e., S={0, 1, 2, 3, 4, 5, 6, 7, 8}.

Information is sent to the decoder regarding whether the mode selected for a given block belongs to the first group or to the second group. If it belongs to the first group, the information is transmitted indicating that ith most probable mode shall be used for a block C given the combination of modes for blocks U and L. In our exemplar, if the decoder receives the information that first group is selected, no further information is required since only one mode belongs to this group. If the mode belongs to the second group, the information is transmitted indicating that jth mode of this group should be used. In our exemplar, if the information is received that the first mode should be selected, mode 0 should be chosen.

Implementation Alternatives:

1. The rules according to which the modes are ordered in set S may differ.

2. The way that the elements of the first set T are specified depends on the prediction modes of neighboring blocks U and L. The elements of this set can be specified for example as a table stored in the memory both of the encoder and decoder, or they can be inferred from the modes U and L themselves.

3. The signaling to the decoder of which mode is selected can be done in numerous ways, for example:
   The information about the rank of the prediction mode in the ordered set R can be transmitted.
   The information regarding which set T or V is selected is followed by the rank of the mode in the selected set.

Preferred implementation for the prediction modes specified in the JVT coder is described as follows.

The same label may be assigned to different prediction modes of blocks U and L before using them to specify prediction mode for block C. Diagonal modes 3, 5 and 8 are grouped together and labeled as 3, and diagonal modes 4, 6 and 7 are grouped together and labeled as 4. After this grouping, each of blocks U and L may have one of the 5 modes labeled as 0, 1, 2, 3 and 4. Therefore, instead of 9×9 possible combination of prediction modes of U and L there are only 5×5 such combinations.

The ordered set S is created by listing the nine prediction modes in ascending order of their number, i.e., S={0, 1, 2, 3, 4, 5, 6, 7, 8}. To each combination of prediction modes for U and L, only one most probable mode is assigned, i.e., the ordered set T for each combination consists of only one element. The assignment is given in Table V.

TABLE V

| L/U | outside | 0 | 1 | 2 | 3 | 4 |
|---|---|---|---|---|---|---|
| outside | 0 | 0 | 1 |   |   |   |
| 0 |   | 0 | 1 | 0 | 0 | 0 |
| 1 |   | 0 | 1 | 0 | 1 | 1 |
| 2 | 2 | 2 | 1 | 2 | 2 | 2 |
| 3 |   | 0 | 1 | 2 | 3 | 4 |
| 4 |   | 0 | 1 | 2 | 4 | 4 |

First information is sent to the decoder whether the most probable mode is used. This information is coded jointly for two 4×4 blocks as given in table below.

TABLE VI

| Codeword | Block 1 | Block 2 |
|---|---|---|
| 0 | x | x |
| 10 |   |   |
| 110 | x |   |
| 111 |   | x |

X denotes that the most probable mode should be used. For the blocks for which the most probable mode m is not used, the code number from 0 to 7 is transmitted indicating which of the remaining modes should be used. Since the remaining modes are ordered according to their number, the mode with a smaller number precedes the mode with a higher number, when the code number q is received, the used prediction mode is equal to:

q, if q<m q+1, otherwise.

The code number q is sent as 3-bit codeword, which is the binary representation of the corresponding code number.

The savings in memory for the method, according to the present invention, comes from the fact that the decoder for each combination of modes of blocks U and L must store, at most, the ordered sets S and T, while S is identical for all the combination of modes for blocks U and L.

In sum, the present invention provides methods, devices and systems for coding into a bitstream and decoding from the bitstream image information comprising a plurality of image blocks using a plurality of spatial prediction modes for intra-mode block prediction. The spatial prediction mode of a current block (C) can be determined based on a plurality of derived prediction modes, derived from the spatial prediction modes of a plurality of neighboring blocks (U, L) of the current block (C). The plurality of n derived prediction modes are grouped into a first group of m first prediction modes with m<n and a second group of second prediction modes. The first prediction modes have a higher probability of occurrence than the second prediction modes. While the first prediction modes are ordered according to their probability of occurrence, the second prediction modes are arranged in a predetermined fashion known to the decoder. Thus, an ordered set is provided to the decoding device so as to allow the decoding device to determine the order of the second prediction modes based on the provided ordered set. The ordered set is associated with one or more group of the spatial prediction modes of the neighboring blocks (U, L) of the current block (C). Furthermore, the bitstream may include coded information indicative of which of the first prediction modes has the highest probability of occurrence when the derived prediction mode with the highest probability of occurrence is selected for use in coding the current block (C). The present invention also provides a computer program having pseudo codes for use in grouping the plurality of derived prediction modes into the first and second groups, and in ordering the first prediction modes according to the probability of occurrence among the first prediction modes.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of coding into a bitstream image information comprising a plurality of image blocks using a plurality of spatial prediction modes for intra-mode block prediction, wherein the spatial prediction mode of a current block is determined based on a plurality of derived prediction modes, which are derived based on the spatial prediction modes of a plurality of neighboring blocks of the current block, said method comprising:

grouping said plurality of derived prediction modes into a first group and a second group, the first group having a first number of first prediction modes and the second group having a second number of second prediction modes, wherein the first number is smaller than the number of the derived prediction modes, and wherein the first prediction modes have a higher probability of occurrence than the second prediction modes, and coding into the bitstream information indicative of whether the spatial prediction mode of the current block belongs to the first group or the second group.

2. The method of claim 1, further comprising
ordering the first prediction modes according to the probability of occurrence among the first prediction modes.

3. The method of claim 1, further comprising
arranging the second prediction modes in a predetermined fashion known to the decoding device.

4. The method of claim 1, further comprising
coding into the bitstream information indicative of which of the first prediction modes has a highest probability of occurrence when the derived prediction mode with the highest probability of occurrence is selected for use in coding the current block.

5. The method of claim 1, wherein an ordered set of prediction modes is known to the decoding device so that the decoding device determines the order of the second prediction modes based on the ordered set.

6. The method of claim 5, wherein the ordered set is associated with more than one group of the spatial prediction modes of a plurality of neighboring blocks of the current block.

7. The method of claim 1, wherein the derived prediction modes are representable by a plurality of different integers and the second prediction modes are ordered according to an order of the integers known to the decoding device.

8. The method of claim 1, wherein the derived prediction modes are representable by a plurality of different integers, each integer corresponding to a derived prediction mode, and wherein the integers are arranged in an ascending order of the integers for providing an ordered set, said method further comprising removing the integers corresponding to the first prediction modes from the ordered set for providing a modified ordered set, so as to allow the decoding device to determine the order of the second group based on the modified ordered set.

9. The method of claim 1, wherein one of said plurality of derived prediction modes is selected for use in coding the current block, said method further comprising providing the decoding device with information indicative of an $i^{th}$ mode among the second prediction modes if the selected one of the combined prediction modes is in the second group.

10. The method of claim 1, further comprising
mapping the spatial prediction modes of the neighboring blocks for providing a complementary prediction mode of the neighboring blocks when needed, determining a complementary prediction mode of the current block based on the complementary prediction mode of the neighboring blocks, and mapping the complementary prediction mode of the current block for obtaining on the spatial prediction mode of the current block.

11. The method of claim 10, wherein
the mapping of the complementary prediction mode of the block is carried out by a mirroring function mirroring the first and second blocks.

12. An encoding device for coding an image comprising a plurality of image blocks using a plurality of spatial prediction modes for intra-mode block prediction, wherein the spatial prediction mode of a current block is determined based on a plurality of derived prediction modes, which are derived based on the spatial prediction modes of a plurality of neighboring blocks of the current block, said encoding device comprising means, for grouping said plurality of derived prediction modes into a first group and a second group, the first group having a first number of first prediction modes and the second group having a second number of second prediction modes, wherein the first number is smaller than the number of the derived prediction modes, and wherein the first prediction modes have a higher probability of occurrence than the second prediction modes, and the second prediction modes are ordered in a predetermined fashion known to a decoding device, and means, for coding into a bitstream information indicative of whether the spatial prediction mode of the current block belongs to the first group or the second group.

13. The encoding device of claim 12, further comprising means, responsive to the first group, for ordering the first prediction modes according to probability of occurrence among the first prediction modes for providing an ordered set.

14. The encoding device of claim 12, further comprising means, for providing the decoding device information indicative of the prediction modes in the ordered set that has a highest probability of occurrence.

15. The encoding device of claim 12, further comprising means capable of providing a complementary prediction mode of the neighboring blocks when needed based on the spatial prediction modes of the neighboring blocks so that a complementary prediction mode of the current block can be determined based on the complementary prediction mode of the neighboring blocks, and means, responsive to the complementary prediction mode of the current mode, for providing the spatial prediction mode of the current block based on a mapping of the complementary prediction mode of the current block.

16. A method for decoding from a bitstream image information comprising a plurality of image blocks using a plurality of spatial prediction modes for intra-mode block prediction, wherein the spatial prediction mode of a current block is determined based on a plurality of derived prediction modes, which are derived based on the spatial prediction modes of a plurality of neighboring blocks of the current block, wherein said plurality of derived prediction modes are grouped into a first group and a second group, the first group having a first number of first prediction modes and the second group having a second number of second prediction modes, wherein the first number is smaller than the number of the derived prediction modes, and wherein the first prediction modes have a higher probability of occurrence than the second prediction modes, said method comprising decoding from the bitstream information indicative of whether the spatial prediction mode of the current block belongs to the first group or the second group so as to allow the decoding device to determine the spatial prediction mode of the current block based on the decoded information, and wherein the decoded information is also indicative of which of the first prediction modes has a highest probability of occurrence when the combined prediction mode with the highest probability of occurrence is selected for use in coding and decoding the current block.

17. An image coding system for coding and decoding an image comprising a plurality of image blocks using a plurality of spatial prediction modes for intra-mode block prediction, wherein the spatial prediction mode of a current block is determined based on a plurality of derived prediction modes, which are derived based on the prediction modes of a plurality of neighboring blocks of the current block, said coding system comprising means, for grouping said plurality of derived prediction modes into a first group and a second group, the first group having a first number of first prediction modes and the second group having a second number of second prediction modes, wherein the first number is smaller than the number of the derived prediction modes, and the first prediction modes have a higher probability of occurrence than the second prediction modes, means, for coding into a bitstream group information indicative of whether the spatial prediction mode of the current block belongs to the first group or the second group, and means, for decoding from the bitstream said group information so as to allow the decoding device to determine the spatial prediction mode of the current block based on said decoded information.

18. The image coding system of claim 17, further comprising means, responsive to the first group, for ordering the first prediction modes according to probability of occurrence among the first prediction modes.

19. The image coding system of claim 17, further comprising means, responsive to the second group, for arranging the second prediction modes in a predetermined fashion known to the decoding device.

20. A software application product embodied in a computer readable storage medium having a software application for use in an image coding system for coding into a bitstream image information comprising a plurality of image blocks using a plurality of spatial prediction modes for intra-mode block prediction, wherein the spatial prediction mode of a block is determined based on a plurality of derived prediction modes, which are derived based on the spatial prediction modes of a plurality of neighboring blocks of the block, said software application comprising a code for use in grouping said plurality of derived prediction modes into a first group and a second group, the first group having a first number of first prediction modes and the second group having a second number of second prediction modes, wherein the first number is smaller than the number of the derived prediction modes, and the first prediction modes have a higher probability of occurrence than the second prediction modes, and a code for use in ordering the first prediction modes according to probability of occurrence among the first prediction modes.

21. The software application product of claim 20, wherein the software application further comprises a code for use in arranging the second prediction modes in a predetermined fashion known to the decoding device.

22. An encoding device for coding an image comprising a plurality of image blocks using a plurality of spatial prediction modes for intra-mode block prediction, wherein the spatial prediction mode of a current block is determined based on a plurality of derived prediction modes, which are derived based on the spatial prediction modes of a plurality of neighboring blocks of the current block, said encoding device comprising:

a first module for grouping said plurality of derived prediction modes into a first group and a second group, the first group having a first number of first prediction modes and the second group having a second number of second prediction modes, wherein the first number is smaller than the number of the derived prediction modes, and wherein the first prediction modes have a higher probability of occurrence than the second prediction modes, and the second prediction modes are ordered in a predetermined fashion known to a decoding device, and a second module for coding into a bitstream information indicative of whether the spatial prediction mode of the current block belongs to the first group or the second group.

23. The encoding device of claim 22, wherein the first module is configured for ordering the first prediction modes according to probability of occurrence among the first prediction modes for providing an ordered set, based on the first group.

24. The encoding device of claim 23, wherein the first module is configured for providing the decoding device information indicative of the prediction modes in the ordered set that has a highest probability of occurrence.

25. The encoding device of claim 23, wherein the first module is configured for
providing a complementary prediction mode of the neighboring blocks when needed based on the spatial prediction modes of the neighboring blocks so that a complementary prediction mode of the current block can be determined based on the complementary prediction mode of the neighboring blocks, and for providing, responsive to the complementary prediction mode of the current mode, the spatial prediction mode of the current block based on a mapping of the complementary prediction mode of the current block.

26. A device comprising:
an encoder; and
a decoder, wherein the encoder is configured for coding an image comprising a plurality of image blocks using a plurality of spatial prediction modes for intra-mode block prediction, wherein the spatial prediction mode of a current block is determined based on a plurality of derived prediction modes, which are derived based on the spatial prediction modes of a plurality of neighboring blocks of the current block, said encoding device comprising:
a first module for grouping said plurality of derived prediction modes into a first group and a second group, the first group having a first number of first prediction modes and the second group having a second number of second prediction modes, wherein the first number is smaller than the number of the derived prediction modes, and wherein the first prediction modes have a higher probability of occurrence than the second prediction modes, and the second prediction modes are ordered in a predetermined fashion known to a decoding device, and
a second module for coding into a bitstream information indicative of whether the spatial prediction mode of the current block belongs to the first group or the second group.

27. The device of claim 26, wherein the decoder is configured for decoding from a bitstream image information comprising a plurality of image blocks using a plurality of spatial prediction modes for intra-mode block prediction, wherein the spatial prediction mode of a current block is determined based on a plurality of derived prediction modes, which are derived based on the spatial prediction modes of a plurality of neighboring blocks of the current block, wherein said plurality of derived prediction modes are grouped into a first group and a second group, the first group having a first number of first prediction modes and the second group having a second number of second prediction modes, wherein the first number is smaller than the number of the derived prediction modes, and wherein the first prediction modes have a higher probability of occurrence than the second prediction modes, said decoder comprising:
a further module, responsive to decoded information, for determining whether the spatial prediction mode of the current block belongs to the first group or the second group, and for selecting the spatial prediction mode based on said determining.

28. The device of claim 27, wherein the further module is configured for determining based on the decoded information which of the first prediction modes has a highest probability of occurrence when the derived prediction mode with the highest occurrence mode is selected for use in decoding the current block.

29. The device of claim 26, wherein the first module is configured for ordering the first prediction modes according to probability of occurrence among the first prediction modes for providing an ordered set, based on the first group.

30. The device of claim 26, wherein the first module is configured for providing a complementary prediction mode of the neighboring blocks when needed based on the spatial prediction modes of the neighboring blocks so that a complementary prediction mode of the current block can be determined based on the complementary prediction mode of the neighboring blocks, and for providing, responsive to the complementary prediction mode of the current mode, the spatial prediction mode of the current block based on a mapping of the complementary prediction mode of the current block.

31. The device of claim 26, comprising a mobile terminal.

* * * * *